United States Patent [19]

Ersoy et al.

[11] Patent Number: 5,492,427
[45] Date of Patent: Feb. 20, 1996

[54] BALL JOINT AND WORK PROCESS FOR PREPARING SAME

[75] Inventors: Metin Ersoy, Walluf; Dirk Mählmann, Osnabrück; Klemens Meyer, Lemförde; Paul Westphal, Stemwede; Uwe Zeibig, Renchen, all of Germany

[73] Assignee: Lemförder Metallwaren AG, Lemförde, Germany

[21] Appl. No.: 184,258

[22] Filed: Jan. 21, 1994

[30] Foreign Application Priority Data

Jan. 20, 1993 [DE] Germany .................. 43 01 301.1

[51] Int. Cl.⁶ .................................................. F16C 11/06
[52] U.S. Cl. .................. 403/77; 403/122; 403/135; 29/441.1
[58] Field of Search ...................... 403/76, 77, 122, 403/131, 135, 140, 141, 133, 281, 279, 274; 29/441.1

[56] References Cited

U.S. PATENT DOCUMENTS

| 3,253,845 | 5/1966 | Davies | 403/122 |
| 3,514,138 | 5/1970 | Davies et al. | 403/77 |
| 3,762,824 | 10/1973 | Kleinschmit et al. | 403/76 X |
| 4,028,784 | 6/1977 | Allison | 403/135 X |
| 4,076,344 | 2/1978 | Gaines et al. | 403/140 X |
| 4,887,486 | 12/1989 | Wood, Jr. | 403/141 X |
| 4,890,949 | 1/1990 | Wood, Jr. | 403/140 X |
| 5,066,160 | 11/1991 | Wood | 403/140 |

FOREIGN PATENT DOCUMENTS

| 2487457 | 1/1982 | France | 403/122 |
| 826809 | 1/1952 | Germany | 403/122 |
| 116315 | 5/1989 | Japan | 403/135 |
| 343297 | 2/1931 | United Kingdom | 403/77 |
| 2220702 | 1/1990 | United Kingdom | 403/122 |

Primary Examiner—Kenneth J. Dorner
Assistant Examiner—Harry C. Kim
Attorney, Agent, or Firm—McGlew and Tuttle

[57] ABSTRACT

A ball joint and a work process for preparing such a ball joint are described, in which the housing is prepared in one piece by a sheet metal shaping process. An edge bead, which is used to close the housing by a cover, is prepared by material deformation on the outer circumference of the housing. A groove for receiving the sealing bellows, which groove is likewise located on the outer circumference of the housing, is formed during the shaping process, so that machining of the housing is not necessary.

10 Claims, 1 Drawing Sheet

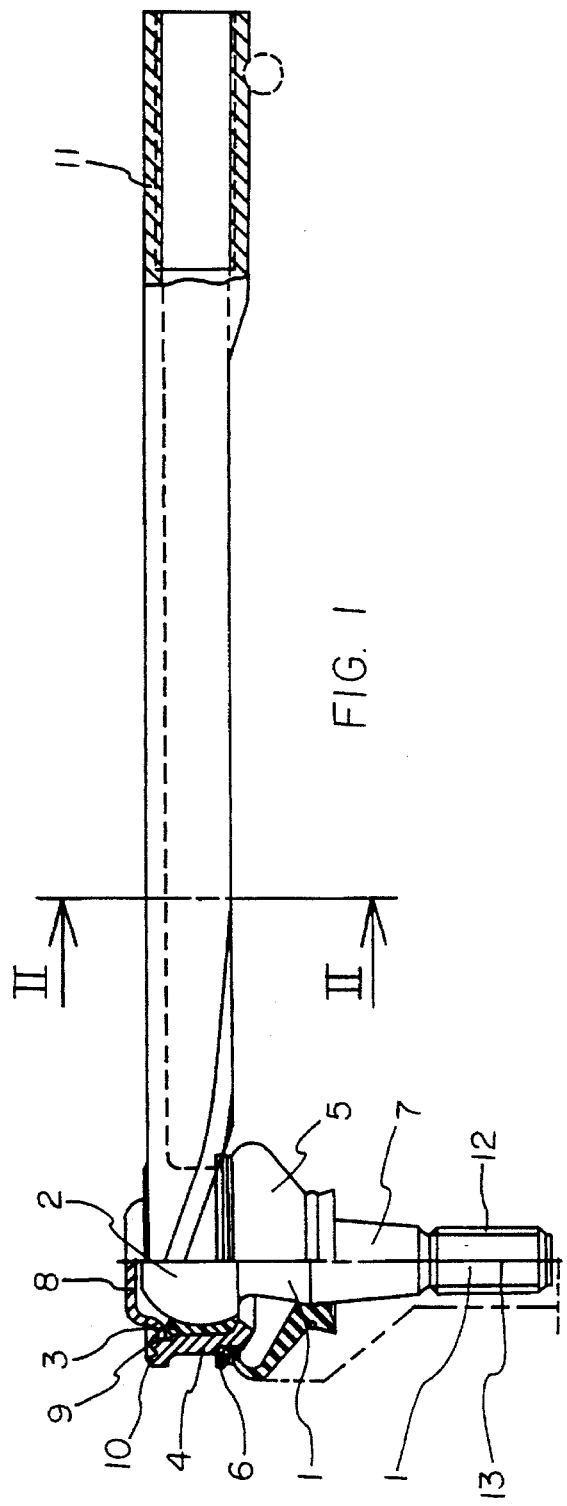
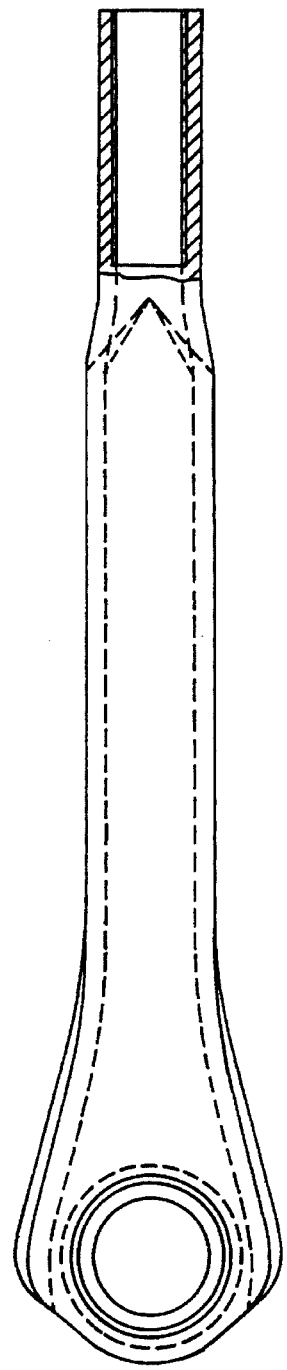

BALL JOINT AND WORK PROCESS FOR PREPARING SAME

FIELD OF THE INVENTION

The present invention pertains to a ball joint with a ball pivot and a joint ball mounted movably in all directions in a bearing shell, with a housing cover which closes the ball joint on one side and a sealing bellows which is fastened to the ball pivot of the ball joint housing.

BACKGROUND OF THE INVENTION

A ball joint, whose housing is prepared from a plurality of sheet metal parts by non-cutting shaping, has been known from DE 30 09 456. The individual parts are nondetachably connected by closed annular ring welding and, on the other hand, locked by a plurality of clamps.

Besides these assembly operations, a narrow ring, which assumes a centering function for the housing parts, is necessary for preparing the joint.

SUMMARY AND OBJECTS OF THE INVENTION

The primary object of the present invention is to provide a ball joint, whose housing can be prepared as a one-part housing and without machining.

A further object of the invention is to develop an easy-to-prepare ball joint with a sheet-metal housing, which is of reduced weight and can be assembled in a simple manner.

These objects are attained by the ball joint housing being prepared by shaping sheet metal mainly according to the deep-drawing process, in a plurality of consecutive operations.

According to the invention, a ball joint housing is closed in a ring-shaped manner and is prepared in one piece with the housing shaft according to a non-cutting sheet metal-shaping process.

The present invention provides a work process including expanding the diameter of the ball joint housing in an outward direction by forming a reinforced edge bead by material displacement in a cover-side area of the housing during sheet metal shaping. The edge bead is split at least partially by means of a wedge-type tool after insertion of the housing cover. The housing cover is subsequently fixed by a shaping process of the material split off. The cylindrical housing part for receiving the bearing shell and the ball pivot is first impressed in the housing sheet metal cut to size.

The shaft is subsequently beaded, while the connection thread area of the housing is also impressed in its final shape in one operation. The thread is formed in the known manner by a rolling process. The material deformations in the bottom and cover areas of the ball joint head, which also include the groove for contacting the sealing bellows, are achieved by rolling deformation of the material after the deep-drawing process.

Since a soft, preferably metallic material is used to prepare the ball joint housing, design measures for increasing the stability are necessary according to the present invention. Thus, projections, which are lateral in the top view, are made in one piece as reinforcing ribs in the transition area between the area of mounting of the ball pivot and the shaft. The shaft advantageously has a profile of U-shaped cross section. Other, e.g., circular or triangular cross section geometries, are possible as well. The length of the shaft depends on the actual intended use of the ball joint.

The peculiarity of the assembly of the individual parts is the arrangement of the housing cover. This is first inserted into the groove provided for it on the internal circumference of the housing. It is in direct contact with the bearing shell, because it fixes the bearing shell in its position. The cover-side edge bead, which is to be prepared during the deformation process, is subsequently notched on the housing by means of a wedge-shaped tool, and the housing cover is then locked by deformation of the notched material.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS In the drawings:

FIG. 1 is a side view of a steering tie rod for motor vehicles with partial cut segments;

FIG. 2 is a sectional view along line II—II according to FIG. 1; and

FIG. 3 is a top view of the steering tie rod for motor vehicles shown in FIG. 1.

DETAILED DESCRIPTION OF THE PREFERRED EMBODIMENT

The embodiment of a steering tie rod for motor vehicles shown in FIG. 1 is comprised of a ball pivot 1, which is mounted movably in all directions in a bearing shell 3 with a joint ball 2, which is connected to the ball pivot 1 in one piece, and of a ball joint housing 4, which accommodates the bearing shell in a cup-shaped area. The joint ball 2 of the ball pivot 1 is joined by a shaft 7, and the latter is joined by a thread 12 for connection in the motor vehicle. The ball pivot exits from the ball joint housing 4 on one side. To guarantee reliable fixation of the position of the bearing shell 3, which preferably consists of a plastic element, the ball joint housing 4 is deformed on the exit side of the ball pivot shaft 7 in the direction of the central axis 13 of the ball pivot 1. The housing is closed by means of a housing cover 8, which is also used to fasten the bearing shell against axial displacement. The housing cover is locked in the housing by a material deformation 9 of the edge bead 10. A wedge-shaped tool is used for this purpose, in order to split the edge bead 10 at least partially in the radial direction. The radially inner area of the notched material is subsequently deformed such that the housing cover 8 is fixed on the ball joint housing. A sealing bellows 5 is in sealing contact with the outer circumference of the housing on the housing side in an annular groove 6. The annular groove is formed according to the present invention either during the deep-drawing process, or by a rolling process immediately subsequent to it. The opposite side of the sealing bellows seals the shaft 7 of the ball pivot in the known manner. The ball joint housing has a connection area 11, which is provided with threads on the side opposite the ball pivot.

FIG. 2 shows how the connection area 11 is designed. The internal thread may also be replaced with external thread, corresponding to the actual requirements of the component. Any geometrically meaningful design of the cross section is possible. The thread may be prepared by a rolling process or by a cutting process.

FIG. 3 shows the top view of the steering tie rod for motor vehicles represented in FIG. 1.

While a specific embodiment of the invention has been shown and described in detail to illustrate the application of the principles of the invention, it will be understood that the invention may be embodied otherwise without departing from such principles.

APPENDIX

List of Reference Numerals:
1 ball pivot
2 joint ball
3 bearing shell
4 ball joint housing
5 sealing bellows
6 annular groove
7 shaft
8 housing cover
9 material deformation
10 edge bead
11 connection thread area
12 thread

What is claimed is:

1. A ball joint comprising:

a joint ball;

a ball pivot connected to said joint ball;

a bearing shell, said joint ball being mounted movably in all directions in said bearing shell;

a housing cover;

a sealing bellows fastened to said ball pivot; and a ball joint housing and integral housing shaft for fastening, said housing and shaft being formed of a single piece of sheet metal, said ball joint housing accommodating said bearing shell for mounting said ball pivot, said ball joint housing being formed with portions of said single piece of sheet metal closed in a ring-shaped manner to form an annularly-closed structure with open cover side and open ball pivot side, said annularly-closed structure having an inner wall which is uninterrupted from said open cover side to said open ball pivot side, said annularly-closed structure being formed in one piece with said housing shaft by shaping said sheet metal in a non-cutting process.

2. A ball joint according to claim 1, wherein:

said open cover side of said housing includes a reinforced edge bead, which is formed by expanding a diameter of said ball joint housing in an outward direction, formed by material displacement in a cover-side area of said housing, said reinforced edge bead being during said shaping of said sheet metal, said edge bead being split at least partially by means of a wedge-shaped tool after insertion of said housing cover, said housing cover being subsequently fixed by a shaping process of said material split off.

3. A ball joint according to claim 2, wherein:

said sealing bellows is in sealing contact with said ball pivot, said sealing bellows projecting at said ball pivot side of said ball joint housing and in a circumferential groove on said ball joint housing, said housing groove being prepared in said ball joint housing by a metal shaping process not including cutting.

4. A ball joint according to claim 3, wherein:

said ball joint housing includes a connection area provided with threads on the side of said ball joint housing, located opposite said ball pivot, said connection having a cross section profile which is non-tubular and is open on one side.

5. A ball joint according to claim 3, wherein:

said housing shaft includes a connection area which is provided with threads on a side of said ball joint housing located opposite said ball pivot, said connection area having a profile with an opening on two sides.

6. A ball joint according to claim 3, wherein:

said ball joint housing shaft includes a connection area provided located opposite said ball pivot, said connection area having internal threads.

7. A ball joint according to claim 3, wherein:

said ball joint housing shaft includes a connection area opposite said ball pivot, said connection area having external threads.

8. A process for forming a ball joint, comprising the steps of:

providing a ball pivot with a joint ball mounted movably in all directions in a bearing shell;

forming a ball joint housing of sheet metal by shaping a single piece of sheet metal without cutting any portion of said sheet metal which is to form part of the housing, to close the ball joint housing in a ring-shape manner to form an annularly-closed structure with an open top and an open bottom out of said single piece of sheet metal, said annularly-closed structure having an inner wall which is uninterrupted from said open top to said open bottom, and positioning said bearing shell within said annularly-closed structure and forming a housing shaft of the same single piece of sheet metal, with the housing shaft extending from the annularly-closed structure and formed integral therewith;

closing the ball joint open top with a housing cover and fastening a sealing bellows to said ball pivot to close the open bottom.

9. A process according to claim 8, further comprising the steps of:

forming said annularly-closed structure by displacing material in a cover-side area of said housing during said sheet meal shaping to expand a diameter of said ball joint housing in an outward direction to form a reinforced edge bead; and splitting said edge bead at least partially by means of a wedge-shaped tool after insertion of said housing cover, said housing cover be subsequently fixed by a shaping process of material which has been split.

10. A process for forming a ball joint, comprising the steps of:

providing a ball pivot with a joint ball mounted movably in all directions in a bearing shell;

forming a ball joint housing of sheet metal by shaping a single piece of the sheet without cutting the sheet metal to close the ball joint housing in a ring-shape manner to form an annularly-closed structure with an open top cover side and an open bottom ball pivot side, said annularly-closed structure having an inner wall which is uninterrupted from said open top cover side to said open bottom ball pivot side, and positioning said bearing shell within said annularly-closed structure and forming a housing shaft of the same single piece of sheet metal, with the housing shaft extending from the annularly-closed structure and formed integral therewith;

closing the ball joint on said cover side with a housing cover and fastening a sealing bellows to said ball pivot to close the ball pivot side.

* * * * *